(12) United States Patent
Sigmon et al.

(10) Patent No.: US 10,846,081 B2
(45) Date of Patent: Nov. 24, 2020

(54) SYSTEM AND METHOD FOR CODE SYNCHRONIZATION BETWEEN MAINFRAME ENVIRONMENT AND DISTRIBUTED ENVIRONMENT

(71) Applicant: MASTERCARD INTERNATIONAL INCORPORATED, Purchase, NY (US)

(72) Inventors: Jeffrey T. Sigmon, St. Louis, MO (US); Archie G. Counts, O'Fallon, MO (US); Henrique Krefer, Curitiba (BR); Oscar David Mejia, Wentzville, MO (US); Kevin Michael Lyons, O'Fallon, MO (US); Dorene Ervans Stuart, Troy, MI (US); James Harold Werner, Canton, MI (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 43 days.

(21) Appl. No.: 16/382,038

(22) Filed: Apr. 11, 2019

(65) Prior Publication Data
US 2020/0326936 A1    Oct. 15, 2020

(51) Int. Cl.
| | | |
|---|---|---|
| G06F 8/76 | (2018.01) | |
| G06F 8/71 | (2018.01) | |
| G06F 8/41 | (2018.01) | |
| G06F 8/70 | (2018.01) | |
| G06F 8/40 | (2018.01) | |
| G06F 16/178 | (2019.01) | |
| G06F 16/18 | (2019.01) | |
| G06F 8/658 | (2018.01) | |
| G06F 16/182 | (2019.01) | |
| G06F 8/60 | (2018.01) | |
| H04L 9/06 | (2006.01) | |
| G06F 8/51 | (2018.01) | |

(52) U.S. Cl.
CPC .................. *G06F 8/71* (2013.01); *G06F 8/40* (2013.01); *G06F 8/41* (2013.01); *G06F 8/48* (2013.01); *G06F 8/51* (2013.01); *G06F 8/60* (2013.01); *G06F 8/658* (2018.02); *G06F 8/70* (2013.01); *G06F 8/76* (2013.01); *G06F 16/178* (2019.01); *G06F 16/182* (2019.01); *G06F 16/1873* (2019.01); *H04L 9/0643* (2013.01)

(58) Field of Classification Search
None
See application file for complete search history.

(56) References Cited

U.S. PATENT DOCUMENTS

| | | | | |
|---|---|---|---|---|
| 7,231,410 | B1* | 6/2007 | Walsh | G06F 8/71 |
| 9,442,718 | B1* | 9/2016 | Wang | G06F 8/71 |
| 2017/0235568 | A1* | 8/2017 | Cowan | G06F 8/73 |
| | | | | 717/122 |
| 2019/0370010 | A1* | 12/2019 | Iley | G06F 11/3696 |

* cited by examiner

*Primary Examiner* — Wynuel S Aquino
*Assistant Examiner* — Mark A Gooray
(74) *Attorney, Agent, or Firm* — Sheppard Mullin Richter & Hampton LLP

(57) ABSTRACT

Systems and methods are provided for using of a single source codebase synchronized between two divergent computing environments. In some embodiments, a version control repository may be utilized to track changes to mainframe source code and synchronize the changed mainframe source code files with a set of source code files stored in the version control repository.

10 Claims, 10 Drawing Sheets

SYSTEM AND METHOD FOR CODE SYNCHRONIZATION BETWEEN MAINFRAME ENVIRONMENT AND DISTRIBUTED ENVIRONMENT

TECHNICAL FIELD

The present disclosure is generally related to data processing. More particularly, the present disclosure is directed to using a single source codebase synchronized between divergent computing environments.

BACKGROUND

Recently, local governments around the world have ramped up regulations related to the protection of financial data, as well as the way in which financial data is used and processed by international financial institutions operating within a country. For example, the Indonesian government has issued a series of rules, including implementation of Government Regulation 82 in 2012, which prohibits storing financial data outside the country without prior approval. Accordingly, financial institutions, e.g., banks, operating in countries in which such regulations are implemented, may have to significantly adapt to the manner in which data processing and code management is performed in order to comply with those regulations.

SUMMARY

In accordance with one or more embodiments, various features and functionality can be provided to enable or otherwise facilitate code synchronization and use of a single source codebase between a mainframe environment and a distributed environment.

In some embodiments, a single mainframe source codebase may be used by two divergent computing environments in a synchronized fashion, despite differences in their corresponding build and deployment processes. In some embodiments, changes made to mainframe source code files stored in a first geographic location may be reflected in a distributed environment, physically located in a second geographic location which may demand on-soil data processing (e.g., in Indonesia).

In some embodiments, application programs running on mainframe servers may use a number of files stored within a mainframe environment. For example, these files may comprise one or more source code files, CICS maps, mainframe libraries comprising modules, load modules, load libraries, text files and/or other type of files stored within multiple mainframe environments.

In some embodiments, by virtue of utilizing a version control repository to version control source code files obtained from a mainframe environment, the present embodiments overcome the disparity in source code management processes between two divergent environments alluded to earlier. In particular, by tracking changes to mainframe source code files via a version control process, conventionally utilized in a distributed environment, the present embodiments permit a single source codebase to be utilized by programs within at least two divergent computing environments. That is, a version control repository may track changes source code performed in a mainframe environment, which in turn permits to incorporate those changes into programs running in a distributed environment.

In some embodiments, by tracking changes to mainframe source code files in a version control system, a set of source code files stored in a version control repository is "updated" and, thus, synchronized with the latest set of mainframe source code files. In some embodiments, the set of baseline source code files may be compared to the set of changed mainframe source code files to determine changes. The changes may be saved as a new version or a 'commit' within a version control repository. For example, the synchronization of changes between mainframe source code files and a set of baseline source code files from which programs configured for a distributed environment have been compiled from may comprise using a web-based repository hosting service.

In some embodiments, a version control repository may be utilized to source-control (i.e., to track changes in a set of mainframe source code files) by creating a set of branches within the repository that correspond to specific mainframe environments. In some embodiments, the set of changed source code files may be synchronized on an environment to branch basis. That is, files from a first mainframe environment may be synchronized with source code files in a corresponding branch before files from a second mainframe environment.

In some embodiments, obtaining changed mainframe source code files from a particular mainframe environment may comprise validating existence of a tag signifying that a particular source code file is not in the process of being deployed and/or installed. Only source code files that do not have the tag will be obtained. Using this tag prevents compiling files prior to deploying the synchronized source code in a distributed environment. One example of such a tag is a BUILD tag.

In some embodiments, not all changed source code files may be synchronized. In some embodiments, changed mainframe files may be filtered to determine a subset of changed mainframe files configured for on-soil compilation.

In some embodiments, determining at least one changed file within the subset of files configured for on-soil compilation by comparing the identified subset of files configured for on-soil compilation and a previous set of mainframes files stored within the version control repository. For example, a hash algorithm may be implemented to perform the comparison.

In some embodiments, uploading the changed mainframe files to a corresponding branch of a version control repository. In some embodiments, the changed mainframe file may be saved as a new version or a 'commit' within a version control repository.

In some embodiments, changed mainframe files may comprise COBOL source code files and CICS map files. In some embodiments, changed CICS map files may be compiled. For example, a result of the compilation of a CICS map file may be a MOD file. In some embodiments, corresponding data structures associated with the changed CICS map file may be updated (e.g., by using COBOL copybook command). In some embodiments, the result of compiling the changed CICS map file, may be published or saved to a build version control repository.

In some embodiments, changed source code files may be compiled resulting in an output file (e.g., a binary executable file). In some embodiments, the listing in the version control repository may be updated. In some embodiments, the output file may be uploaded to a build version control repository.

In some embodiments, the changed source code files may be published by obtaining an output file from a build version control repository and a corresponding changed source code file obtained from the version control repository. In some embodiments, a determination may be made as to which changed source code file corresponds to the output file. In some embodiments, a hash value generated by a hash algorithm may be used to determine the corresponding changed source code file. In some embodiments, a package using the changed source code file and the output file may be created, published, and deployed.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

Figure 1:
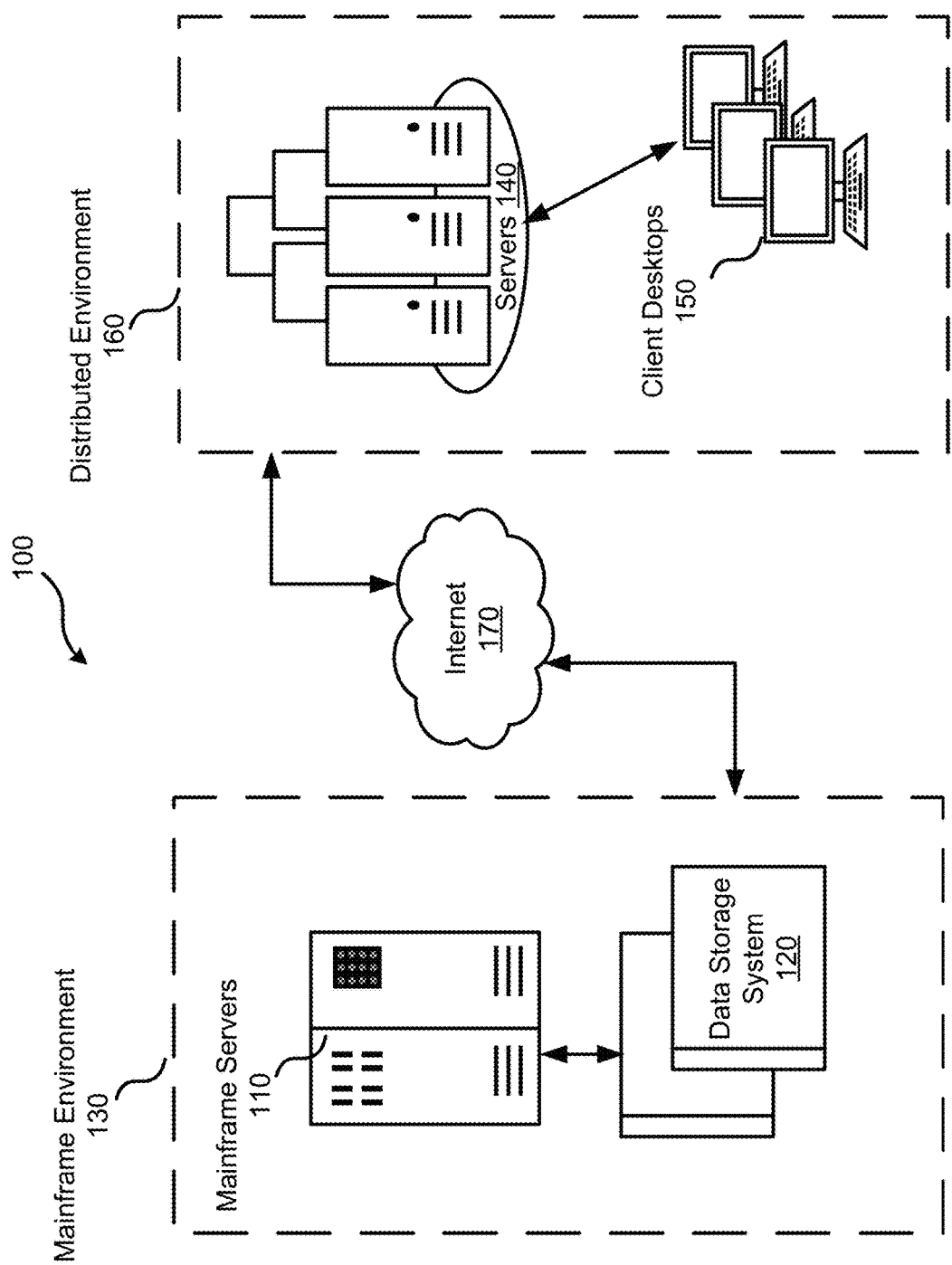
FIG. 1 illustrates an example data processing system using a mainframe environment and a distributed environment, according to an implementation of the disclosure.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

There are currently more than 21,000 IBM® mainframe data centers worldwide. Additionally, seventy percent of all business information resides in mainframe databases. The Common Business Oriented Language (COBOL) is a programming language primarily used in mainframe environments. Mainframes are critical to the operations of many banks, insurance companies, transportation systems and governmental agencies. The advantages of COBOL include its maintainability and its portability across hardware platforms and operating systems. Despite having been developed in 1959, COBOL is still the programming language that many large financial business applications use today, and the performance of these programs or applications is often critical to operation of a business.

As alluded to above, recent international regulations related to financial data storage demand that financial institutions operating within certain countries, such as Indonesia, to maintain and store programs within data centers located on-soil within a particular country. Because a majority of financial companies continue to use COBOL programs which operate in a mainframe environment, compliance with these recent regulations may require maintaining a separate mainframe environment within individual countries. However, maintaining a parallel mainframe environment may be costly and inefficient.

Various embodiments of the present disclosure leverage the ability of using a single mainframe source codebase by two divergent computing environments in a synchronized fashion despite differences in their corresponding build and deployment processes. In particular, changes made to mainframe source code files may be synchronized across divergent environments. For example, changes may be propagated to a more cost-effective, distributed environment, such as UNIX, Linux, etc., which relies on the same mainframe source code files. In other words, changes to the mainframe source code made in the mainframe environment will be reflected in the source code files used by the programs in the distributed environment.

In some embodiments, by virtue of synchronizing source code files between two divergent computing environments, changes made to the mainframe source code files may be reflected in a distributed environment, physically located in a geographic location which demands on-soil data centers (e.g., in Indonesia). Accordingly, entities may utilize a single database storage and management system environment outside of the on-soil geographic location (e.g., in the United States) without jeopardizing existing business applications while complying with local data storage and processing regulations.

It should be noted that various embodiments are described in the context of financial payment processing systems and financial regulations which require data to be kept within a country, i.e., "on-soil." However, it should be understood that other (e.g., non-financial) regulations or requirements may necessitate data processing compliance, which in turn may increase demand for local data centers that have the capability to use a single source code database in a synchronized fashion between divergent environments (e.g., a mainframe and a distributed environment).

FIG. 1 illustrates an example of a computer system 100 in which various embodiments may be implemented. In this example, computer system 100 may be an Internet-connected computer system. In some embodiments, computer system 100 may be server-based in its design and may include a mainframe environment 130 and a distributed environment 160. Mainframe environment may include mainframe servers 110, a large data-storage system 120, and/or other components. Data-storage system 120 may include data and utilize a database management system. Distributed environment 160 may include server 140, client desktop 150 (e.g., personal computers or other types of personal computing devices), and/or other components. In some embodiments, components of mainframe and distributed environments 130, 160 may be interconnected through various communications and networking systems that together comprise Internet 170. In some embodiments, computer systems, such as system 100 illustrated in FIG. 1, may be interconnected by local networks, wide-area networks, wireless communications, and/or other communication methods.

In some embodiments, distributed environment 160 may be configured as a computing environment for on-soil transaction processing. For example, by virtue of being physically located in a particular location, such as Indonesia, distributed environment 160 may be configured for on-soil transaction processing. In some embodiments, applications and/or programs may be stored on one or more servers 140, i.e., at the server level, and downloaded to client desktops 150 when needed. As will be described in more detail, servers 140 within the distributed environment 160 may run one or more platforms, including Unix/Linux, Mac OS X, and/or Microsoft Windows. Distributed environment 160 may utilize one or more database, e.g., Oracle Linux, a database manager, e.g., Microsoft SQL server, and other components.

In some embodiments, mainframe servers 110 may be running a z/OS and/or other such 64-bit operating systems for IBM mainframes which support stable mainframe systems and standards such as CICS, COBOL, IMS, DB2, RACF, SNA, WebSphere MQ, record-oriented data access methods, REXX, CLIST, SMP/E, JCL, TSO/E, and ISPF, 64-bit Java, C, C++, and UNIX (Single UNIX Specification) APIs and applications through UNIX System Services.

In some embodiments, one or more mainframe servers 110 may be configured to communicate with one of servers 140. In some embodiments, one or more tools and/or protocols may be used to support mainframe-to-server communications. For example, tools and protocols may include IBM DDCS for communication with DB2, DTF to MVS/CICS, LU2 to MVS/IMS, IBM's MQ Series software, Texas Instruments (TI) Communication Bridge, and/or other such tools and protocols.

In some embodiments, mainframe servers 110 may be configured to run application programs to process workloads (e.g., batch processing and online transaction processing). In some embodiments, application programs may comprise code written in one or more of programming languages configured to support a number of operating systems and/or environments. For example, an application program may be a COBOL application (i.e., an application written in COBOL programming language).

In some embodiments, mainframe servers 110 may be configured to run as CICS application servers (Customer Information Control System). In some embodiments, mainframe servers 110 may be run under MVS/CICS. CICS is an online transaction processing (OLTP) system that provides specialized interfaces to databases, files and terminals in support of business and commercial applications. CICS may comprise one or more mainframe servers that provide online transaction management and connectivity. In particular, CICS is a layer of middleware that integrates all basic software services required by OLTP applications and is designed to support rapid, high-volume online transaction processing. In some embodiments, CICS applications may comprise transactions, which can be written in a number of programming languages, including COBOL, PL/I, C, C++, IBM Basic assembly language, REXX, and Java. A CICS transaction is a unit of processing which is usually interactive (screen-oriented). CICS screens may be stored as a module created with Basic Mapping Support (BMS) assembler macros or third-party tools (e.g., a CICS map). The map may define screen format and may require a load module in a CICS load library.

In some embodiments, application programs running on mainframe servers 110 may use a number of files stored within mainframe environment 130. For example, these files may comprise one or more source code files, CICS map files, mainframe libraries comprising modules, load modules, load libraries, text files and/or other type of files stored within multiple mainframe environments. In some embodiments, mainframe environment 130 may use IMS/DB (DataBase) and DB2 database management systems.

In some embodiments, application programs may comprise a number of programs. By virtue of programs being a part of a larger set of applications, an output from one application may be an input to the next application. Often, system testing is conducted to verify that a new or changed program does not cause problems when incorporated into a larger set of applications. Modifications to source code files may be tracked using a source code change control tool. In some embodiments, divergent computing environments may utilize one or more change or version control tool. In some embodiments, these change control tools may utilize distinct and often incompatible processes.

In some embodiments, in a mainframe environment, changes to source code files are tracked and maintained using a source code management tool and a process of program "promotion." For example, following a successful system test in mainframe environment 130, programs may be transferred from a first mainframe environment into a second mainframe environment. For example, the first and second environments may be a test and production environments, respectively. In some embodiments, transferring a program from a first environment into a second environment, referred to as promoting an application, may comprise tracking any source code modifications. That is, during a promotion, changes to source code files and previously compiled output files moved into the next environment may be tracked using a source code management tool. One example of a source code management tool may be Endevor and/or other such tool.

In some embodiments, in a distributed computing environment, changes to a set of source code files over time are tracked and maintained using a version or a revision control process and/or system. For example, a centralized version control systems may be used to track and control changes to source code. Alternatively, a version control system, which uses a peer-to-peer approach to version control, which synchronizes repositories by exchanging patches from peer to peer.

In some embodiments, a baseline version of a set of source code files from which subsequent changes may be made is housed in a version control repository. In some embodiments, source code files that are under version control are changed, after being retrieved or "checked out," are not reflected in the revision control system (i.e., the repository), unless these files are "checked in" or "committed." Accordingly, to commit is to write or merge the changes made in the working copy back to the repository. Further, a 'commit' may describe a new version that is created as a result of committing. One example of a version control system is Bitbucket. In some implementations, Bitbucket may comprise a centralized web-based repository used to house source code files within a distributed environment.

Typically, compiled mainframe programs may not be deployed in a distributed environment unless a specialized compiler or translator is used. The resulting executable program (i.e., a program generated by the specialized compiler) may be used on one or more platforms, including Unix/Linux, Mac OS X, and Microsoft Windows, within distributed environment 160. For example, a COBOL compiler program, such as MicroFocus, may be used to read COBOL source code, compile it, and produce, as output, an executable program.

However, using a specialized compiler to generate a program configured for a distributed environment compiled from mainframe source code files, does not take into consideration any future source code modifications within the mainframe. For instance, any changes to the source code that took place in the mainframe environment 130 will not be reflected in a program compiled from an earlier set of source code files (i.e., prior to modifications taking place in the mainframe) for distributed environment 160.

Accordingly, maintaining a database to store and modify source code files used to compile and build application programs for two divergent environments may not be feasible without a source-control management process that would propagate source code modifications made in a first environment into a second environment. That is, modifications to the mainframe source code can be easily reflected within programs running in mainframe environment 130, by virtue of these programs utilization of source code files stored in a mainframe. However, the same modification will affect the programs running in distributed environment 160. Thus, the modifications to the source code files from which the distributed programs have been compiled are generally not going to be available unless a process that permits tracking and synchronizing changed mainframe source code files is implemented.

Implementing a source code management process within two environments that are generally controlled and coordinated by non-compatible operating systems may be challenging because of distinct source code management processes along with distinct build and deployment processes utilized within each system. For example, as alluded to earlier, a mainframe source code management process, implemented via a source code management tool, such as Endevor, which promotes source code files by moving them to the next mainframe environment is generally not compatible with a distributed source code management process implemented via version control management tools (e.g., Bitbucket). Furthermore, conventionally, version control systems or repositories are not used to perform source code management for mainframe source code due to non-compatibility issues that exist between mainframe and distributed environments.

In some embodiments, by virtue of utilizing a version control repository to version control source code files obtained from a mainframe environment, the present embodiments overcome the disparity in source code management processes between two divergent environments alluded to earlier. In particular, by tracking changes to mainframe source code files via a version control process, the present embodiments permit a single source codebase to be utilized by programs within at least two divergent computing environments. That is, a version control repository tracks changes to source code performed in a mainframe environment, which in turn permits to incorporate those changes into programs running in a distributed environment.

In some embodiments, by tracking changes to mainframe source code files in a version control system, a set of source code files stored in a version control repository is "updated" and, thus, synchronized with the latest set of mainframe source code files. In some embodiments, the set of baseline source code files may be compared to the set of changed mainframe source code files to determine changes. The changes may be saved as a new version or a 'commit' within a version control repository. For example, the synchronization of changes between mainframe source code files and a set of baseline source code files from which programs configured for a distributed environment have been compiled from may comprise using a web-based repository hosting service, such as Git or Bitbucket.

In some embodiments, by virtue of synchronizing mainframe source code files with files stored in a version control repository permits entities to maintain a single mainframe source codebase used by programs within both mainframe and distributed environments. Furthermore, by virtue of tracking changes within the mainframe source code files provides a way to synchronize only the changed mainframe source code files rather than importing all of the mainframe source code files each time. Accordingly, synchronizing only the changed source code files provides a more feasible and cost-effective approach to using a single source code database by two divergent computing environments.

In some embodiments, mainframe servers 110 may comprise a number of environments associated with one or more mainframe programs. For example, mainframe environments may comprise Interactive Development environment (DTF) environment, a Member Testing environment (MTF), a System Testing environment (ITF), a production environment (PROD), and so on.

In some embodiments, a version control repository may be utilized to source-control (i.e., to track changes in a set of mainframe source code files) by creating a set of branches within the repository which correspond to specific mainframe environments. In some embodiments, the set of changed source code files may be synchronized on a single environment-to-branch basis. That is, files from a first mainframe environment may be synchronized with source code files in a corresponding branch before files from a second mainframe environment synchronized with the source code files in a corresponding branch, and so on.

In some embodiments, in order to facilitate the synchronization of changed mainframe source code files, source code files from each of the mainframe environments may be synchronized with source code files in each of the corresponding branches within the version control repository via a synchronization process described in detail below.

Figure 2:
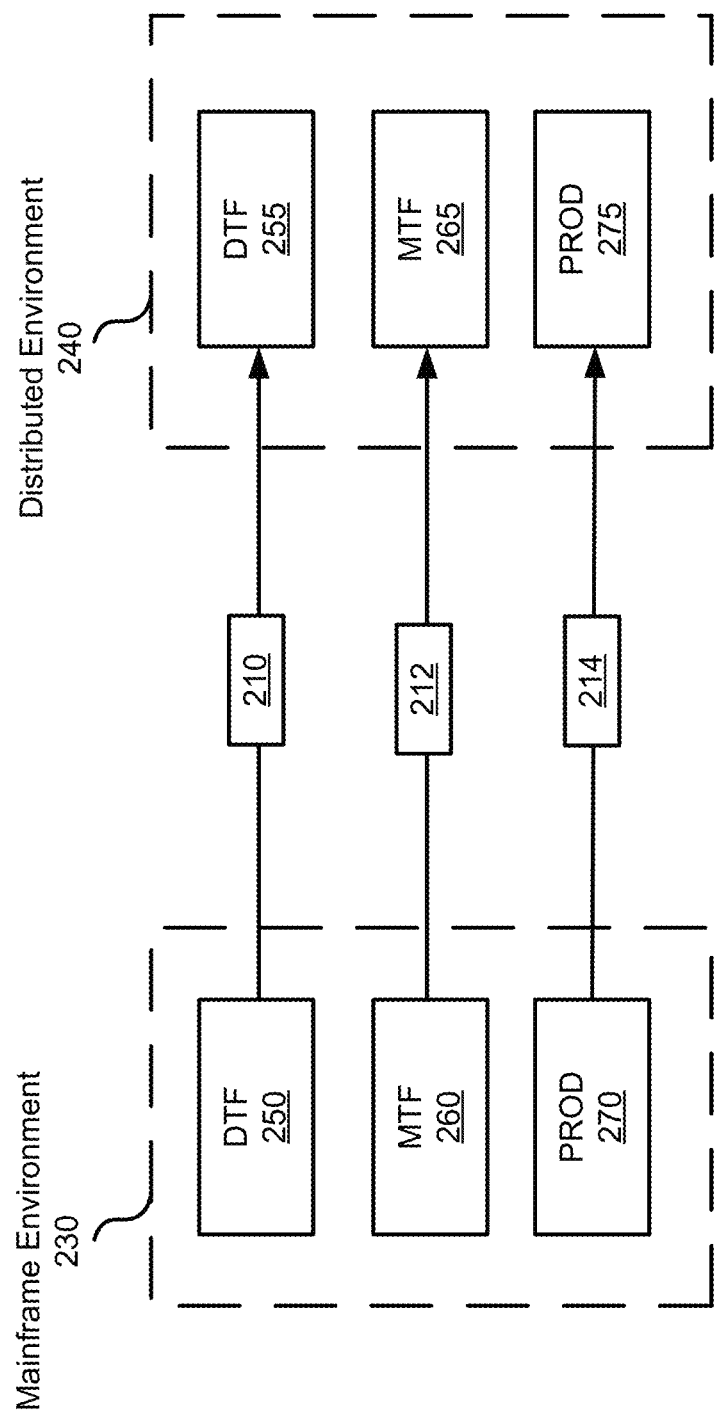
FIG. 2 illustrates an example set of mainframe environments and a corresponding set of branches within a version control repository, according to an implementation of the disclosure.

For example, and as illustrated in FIG. 2, mainframe environment 230 may comprise DTF environment 250, MTF environment 260, and PROD environment 270. A version control repository 240, may comprise branches that correspond to the mainframe environments such as DTF branch 255, MTF branch 265, and PROD branch 275. The source code may be synchronized between each of the mainframe environments 250, 260, and 270, and corresponding branches 255, 265, and 275.

Upon actuating synchronization process 210, changes to mainframe source code files within DTF environment 250 may be propagated to the source code files residing within corresponding DTF branch 255. Similarly, upon actuating synchronization processes 212, 214, changes to mainframe source code files within MTF and PROD environments 260, 270 may be propagated to the source code files residing within corresponding MTF and PROD branches 265, 275, respectively. By virtue of actuating synchronization processes 210, 212, and 214, the mainframe source code files within DTF, MTF, and PROD environments 250, 265, and 270 may result in a mirror image of the source code files within residing within the corresponding DTF, MTF, and PROD branches 255, 265, and 270, respectively.

Referring back to FIG. 1, servers 140 on distributed environment 160 may be configured to initiate source code synchronization between mainframe environment 130 and a version control repository (not shown) within distributed environment 160. As described in detail below, at least one of distributed servers 140 may be configured to perform the steps of synchronization. Once the source code is synchronized, at least one of distributed servers 140 may be configured to initiate a build process during which the changed source code files are compiled and otherwise prepared to be deployed within distributed environment 160. For example, server 140 may identify changed mainframe source code files, compile these files to generate an output file, and deploy the output file. In one embodiment, the output file may be a binary executable.

Figure 3:
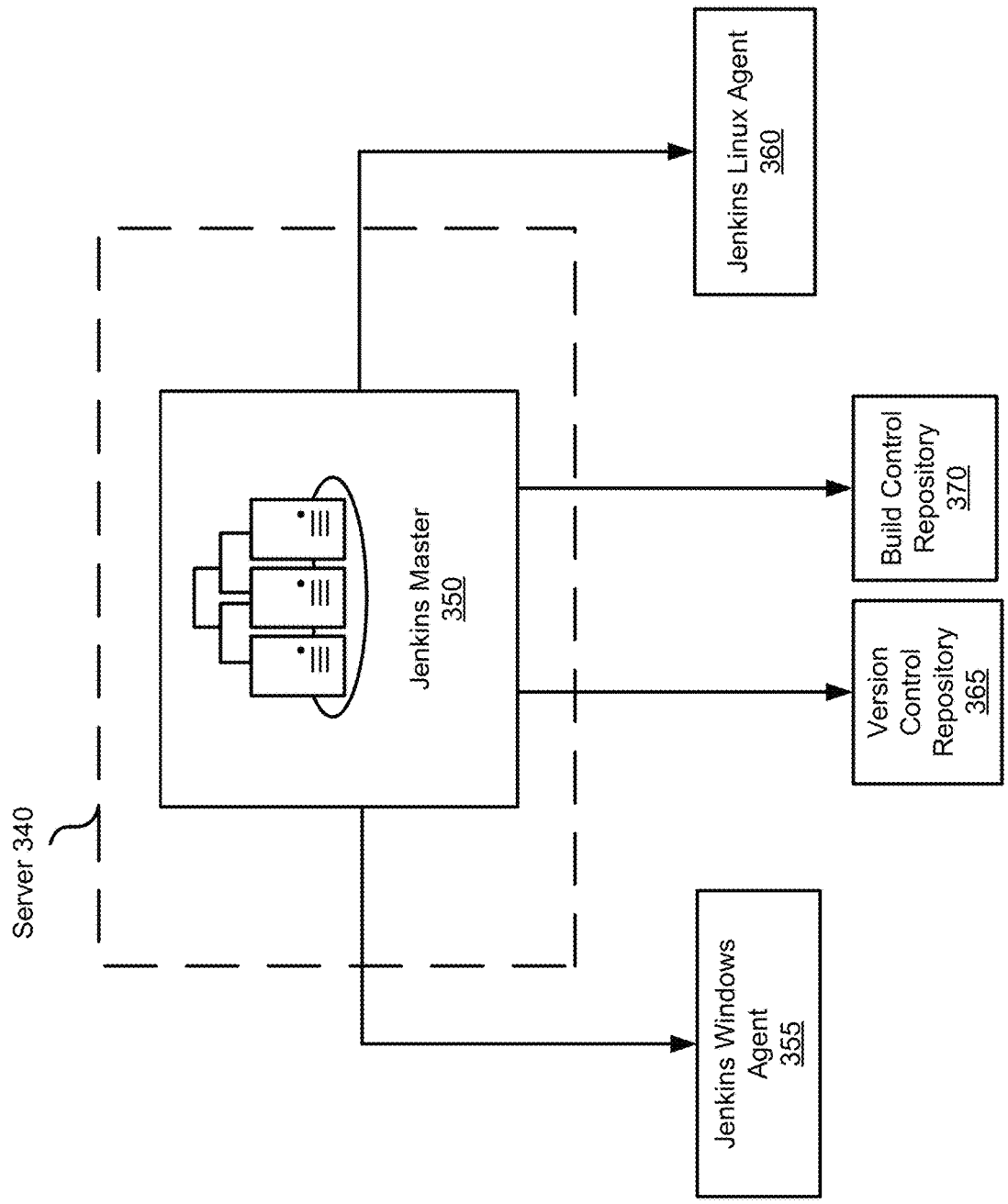
FIG. 3 illustrates an example master/slave architecture used to synchronize files between a mainframe environment and a distributed environment, according to an implementation of the disclosure.

Referring now to FIG. 3, server 340, one of the distributed servers, and an example embodiment of one of servers 140 within distributed environment 160 in FIG. 1, may be configured to initiate a source code synchronization process, a build process, and a deployment process. Utilizing the master/slave architecture permits server 340 to distribute workload associated with one or more processes or operations (e.g., build and deployment) to multiple slave or agent nodes within distinct environments (e.g., a build environment). Within the framework of master/slave architecture, server 340 may be a master node and may be used to perform a number of operations. For example, server 340 may run scheduling jobs, monitor slave nodes, dispatch build commands to slave nodes, record and represent the build result, as well as execute build jobs directly.

One example of master/slave server architecture is a Jenkins master/slave architecture. For example, server 340, as illustrated in FIG. 3, may be configured as Jenkins master server 350. Jenkins master server 350 may be configured to distribute workflow of different program building tasks to multiple agent nodes during each program build, such as Jenkins Window and Jenkins Linux agents 355, 360, each operating within different computing environments (i.e., Windows and Linux).

In some embodiments, serer 340 may be communicatively coupled to one or more slave nodes. Slave nodes may be configured to offload build projects from the master. Slave nodes may be configured operate in one or more distributed computing environments. In some embodiments a slave node may be configured to synchronize source code files between a mainframe source codebase and a version control repository. In some embodiment, a slave node may be configured to compile, build, and deploy the synchronized source code files. In some embodiments, a slave node may be hosted in a network segment that has access to the source code residing within mainframe.

For example, Jenkins Windows agent 355 may be a slave node configured to synchronize source code between a mainframe source codebase and a version control repository 365. In some embodiments, a Virtual Machine server may be configured as a Jenkins agent. In some embodiments, Jenkins Windows agent 355 may be configured to build CICS map files.

Jenkins Linux Agent 360 may be a slave node configured to compile and build mainframe programs that will be deployed into a specialized compiler environment. One such example of a specialized compiler environment is a Micro-Focus environment which may be configured to compile COBOL source code into programs used in a distributed rather than a mainframe environment.

In some embodiments, server 340 may be communicatively coupled to one or more datastores, file repositories, and/or other such components. For example, Jenkins master server 350 may be communicatively coupled to a version control repository 365, (e.g., Bitbucket). As explained earlier, version control repository 365 may be used to house mainframe source code from which programs are compiled for a distributed environment.

In some embodiments, Jenkins master server 350 may be communicatively coupled to a build version control repository 370. Build version control repository 370 may be configured to store and control artifacts generated during a program build process. For example, Artifactory may be one such build version control repository 370.

Referring back to FIG. 1, servers 140 on distributed environment 160 may be configured to initiate mainframe source code synchronization between mainframe environment 130 and a version control repository within distributed environment 160. At least one of the servers 140 may be configured as a Jenkins master server to synchronize source code files changed within a mainframe database. At least one of servers 140 may be configured to compile and build programs using the changed source code files.

In some implementations, source code files stored within data-storage system 120 may be used in programs implemented within both mainframe environment 130 and distributed environment 160. For example, the source code files may include COBOL source code files, CICS map files, and/or other such files. As will be described in more detail, not all mainframe source code files and/or CICS map files may be synchronized between mainframe environment 130 and version control repository. For example, only COBOL source code files and/or CICS map files used by modules configured for on-soil compilation may be synchronized within the distributed environment running on server 140 at a certain geographic location.

Figure 4:
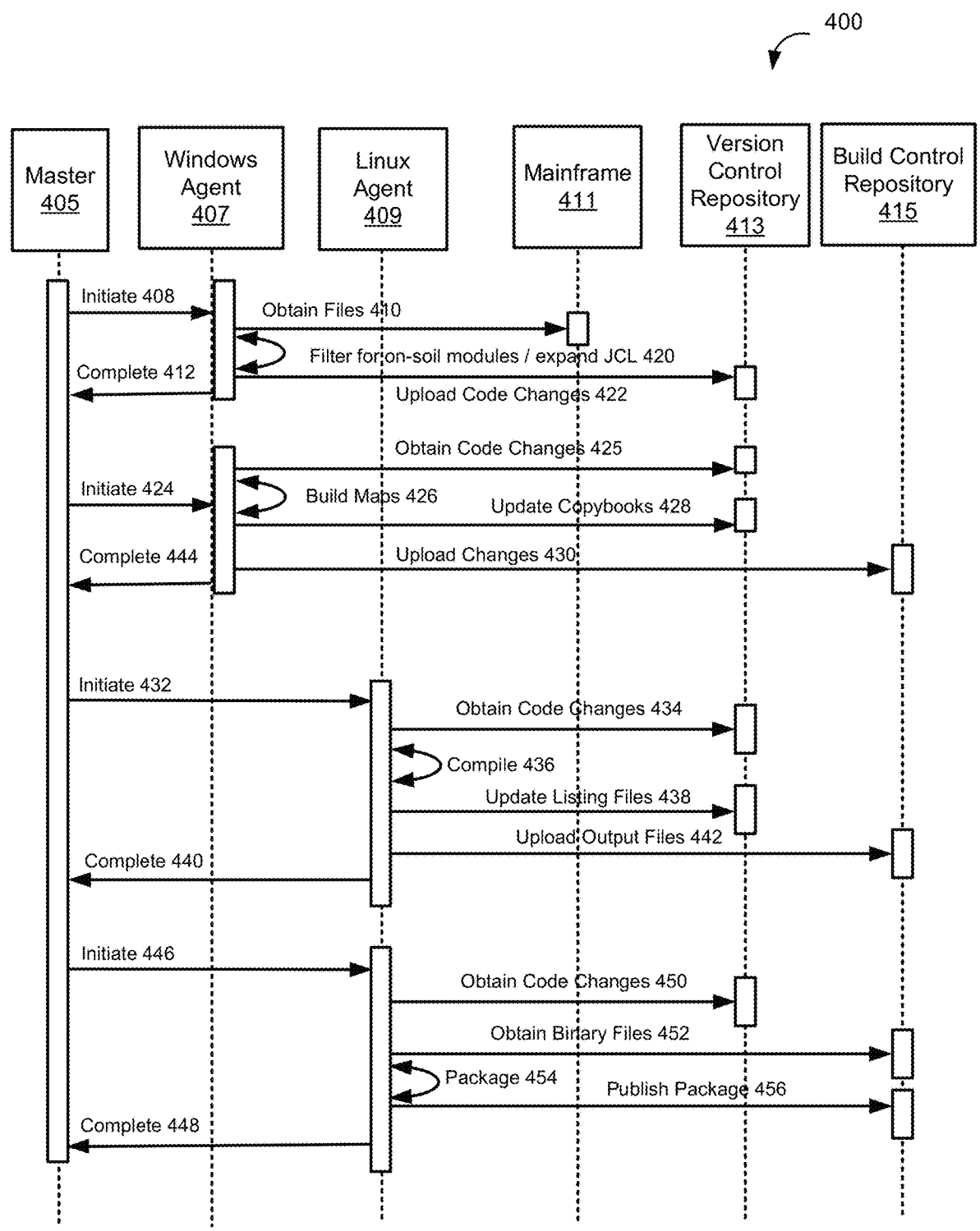
FIG. 4 illustrates a process of using a version control system to synchronize code maintained in a single mainframe code base, according to an implementation of the disclosure.

FIG. 4 illustrates a process 400 for performing a synchronization, building and publishing sequence which allows utilizing a single mainframe program source codebase for programs running within both a mainframe and distributed environments, according to an implementation of the disclosure.

In an operation 408, process 400 may include a synchronization command from Jenkins master server 405 to a Windows agent 407. In some embodiments, the synchronization command from Jenkins master server 405 to a Windows agent 407 may be user generated. For example, a user may request a synchronization of mainframe files from a particular mainframe environment (e.g., DTF) by selecting an icon on a graphical user interface located on Jenkins master server 405. In some embodiments, the synchronization command from Jenkins master server 405 to a Windows Agent 407 may be automatic.

In an operation 410, process 400 may include Windows agent 407 obtaining mainframe files from mainframe host

411. For example, mainframe files may comprise COBOL source code files and CICS map files. In an operation 420, process 400 may include Windows Agent 407 filtering mainframe files to determine a subset of files configured for on-soil compilation. For example, in an operation 420, the filtering of mainframe files may be done by using a set of Job Control Language (JCL) commands and/or JCL expanded commands. In some embodiments, JCL commands may be used to determine a subset of files configured for on-soil compilation. In some embodiments, JCL commands may be used to determine a subset of modules configured for on-soil compilation.

In an operation 422, process 400 may include determining at least one changed file within the subset of files configured for on-soil compilation. For example, the operation 422 may determine the at least one changed file within the identified subset of files configured for on-soil compilation. That is, operation 422 may determine what changes have occurred since the last time (i.e., relative to a specified time period) files have been synchronized. In some embodiments, the changed file is determined by comparing the identified subset of files configured for on-soil compilation and a previous set of mainframes files stored within the version control repository 413. For example, a hash algorithm may be implemented to perform the comparison. In some embodiments, the hash algorithm may generate a value in response to processing each a changed mainframe file and a file residing within a version control repository. Values generated by the hash algorithm for each file may be compared such the same values may indicate that no changes have been made to the mainframe file. Conversely, different values may indicate that the mainframe file has been changed. In some embodiments, the values generated by the hash algorithm may be stored within a version control repository.

In an operation 422, process 400 may include uploading the changed mainframe files to a corresponding branch of a version control repository 413 (e.g., Bitbucket). In an operation 412, process 400 may include Windows agent 407 communicating to Jenkins Master server 405 that the mainframe code synchronization operation 408 has been completed.

In an operation 424, process 400 may include a changed CICS map processing command from Jenkins master server 405 to Windows agent 407. In an operation 425, process 400 may include Windows agent 407 obtaining and compiling the at least one changed CICS map file uploaded to a branch within version control repository 413 corresponding to a mainframe environment during operation 422. In some embodiments, the result of the compilation of operation 425 may be a MOD file. In an operation 426, process 400 may include Windows agent 407 building the compiled CICS map file by processing compiled CICS map files. In an operation 428, process 400 may include Windows agent 407 updating corresponding data structures associated with the changed CICS map file. For example, by using COBOL copybook command. COBOL copybook is a selection of code that defines data structures. In an operation 430, process 400 may include Windows agent 407 publishing or saving the MOD file, a compiled changed CICS map file, to a build version control repository 415 (e.g., Artifactory). In an operation 444, process 400 may include Windows agent 407 communicating to Jenkins Master server 405 that the changed CICS map processing operation 424 has been completed.

In an operation 432, process 400 may include a changed source code processing command from Jenkins master server 405 to Linux Agent 409. In an operation 434, process 400 may include Linux agent 409 obtaining a changed mainframe source code file uploaded to a version control repository 413 during operation 422. In an operation 436, process 400 may include Linux Agent 409 compiling the changed source code file resulting in an output file (e.g., a binary executable file). In an operation 438, process 400 may include Linux agent 409 updating the listing in the version control repository 413. In an operation 442, process 400 may include Linux Agent 409 uploading the output file to a build version control repository 415. In an operation 440, process 400 may include Linux Agent 409 communicating to Jenkins Master server 405 that the changed source code processing operation 432 has been completed.

In an operation 446, process 400 may include a publishing command from Jenkins master server 405 to Linux agent 409. In an operation 450, process 400 may include Linux agent 409 obtaining a changed source code file uploaded to the version control repository 413 during operation 422. In an operation 452, process 400 may include Linux agent 409 obtaining an output file from a build version control repository 415. In some embodiments, in an operation 452, process 400 may include determining a changed source code file obtained from the version control repository 413 that corresponds to the output file obtained from a build version control repository 415. In some embodiments, a hash value generated by a hash algorithm may be used to determine the corresponding changed source code file.

In an operation 454, process 400 may include Linux Agent 409 creating a package using the changed source code file and the output file. In an operation 456, process 400 may include Linux Agent 409 publishing the package to build version control repository 415. In an operation 456, process 400 may include Linux Agent 409 uploading the package to build version control repository 415. In an operation 448, process 400 may include Linux Agent 409 communicating to Jenkins Master server 405 that the package publishing operation 446 has been completed.

FIGS. 5-9 illustrate the steps detailed in FIG. 4.

Figure 5:
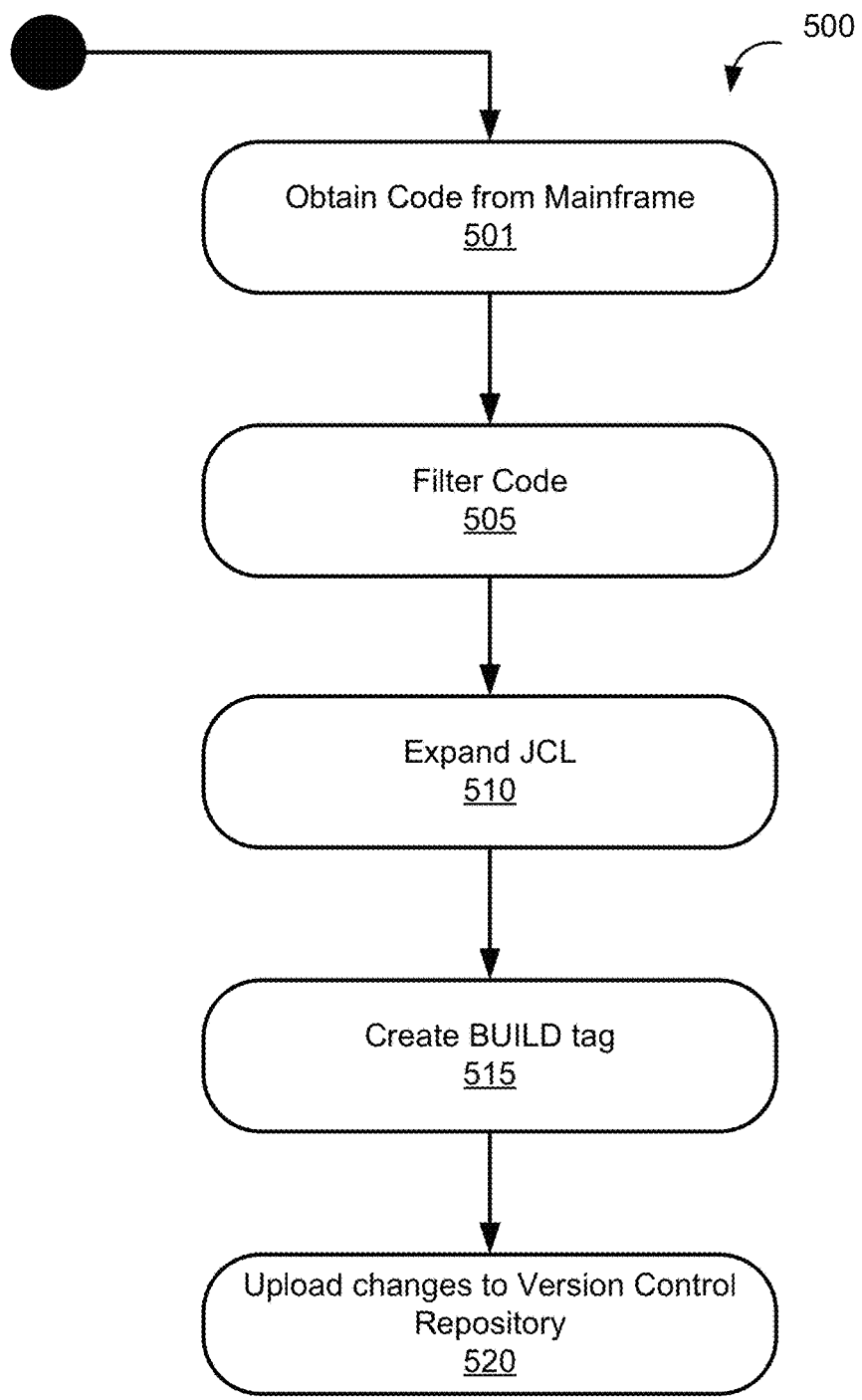
FIG. 5 illustrates a process of synchronizing files from a mainframe environment into a distributed environment, according to an implementation of the disclosure.

FIG. 5 illustrates a process 500 of synchronizing mainframe files between a mainframe environment and a version control repository, according to an implementation of the disclosure. For example, COBOL source code files may be residing in a DTF mainframe environment. The DTF mainframe environment may include one or more systems, such as an on-soil specific system (LS), a Local Clearing Management System (IP), a Mastercard Debit Switch system (MS), and a Mastercom system (EM). The LS environment may keep a list comprising a list of systems (e.g., a manifest) and a list comprising a list of programs utilized by LS (e.g., a whitelist).

In an operation 501, process 500 may include fetching source code files from a mainframe environment. For example, source code files may include mainframe source code files, CICS map files, and/or other files. In some embodiments, in an operation 501, process 500 may include performing fetching by using a tool, such as, e.g., a Micro-Focus syncmon tool. In some embodiments, individual mainframe environments may use a dedicated syncmon tool. That is, syncmon tool may be used within individual environment based on command parameters (e.g., environment name, system, subsystem, type, and stage). All the source code files from all the system within the DTF environment will be downloaded. Syncmon may be configured to be executed via a script which may include one or more parameter associated with files that are being downloaded. For example, syncmon may download all files form the LS, IP, MS, and EM systems and download selected files (i.e., files specified via the one or more parameters) from other systems. The downloaded files may be placed within a SYNCEnv folder.

In some embodiments, fetching using syncmon may include validating existence of a tag that signifies that a source code file is not in the process of being deployed and/or installed within a distributed environment. Only source code file that does not have the tag will be fetched. Using this tag prevents synchronizing files prior to deploying the synchronized source code in a distributed environment. One example of such a tag is a BUILD tag.

In an operation 505, process 500 may include filtering downloaded files in operation 501 to determine at least one file configured for on-soil specific system (LS). For example, using a file DOC type maintained within Endevor may be used to determine which files are configured for LS. A whitelist within each system may provide information related to which files and their corresponding DOC types are configured for LS. DOC types may include the following tags: AR, CR, DB, EM, FC, GB, GO, IP, LS, MS, SC, TS, VP. For each system, system names may be found in a system manifest file listed. An initial version of the whitelist may be created from a most recent and/or valid list of all modules that belong to LS for each system (e.g., a platinum inventory). Additionally, whitelist may contain raw pre-expanded JCL name.

In an operation 510, process 500 may include expanding JCL commands to determine at least one module configured for on-soil compilation. That is, JCL commands associated with each of system may be individually expanded.

In an operation 515, process 500 may include generating and associating a tag (e.g., BUILD tag) with files that are being presently synchronized.

In an operation 520, process 500 may include using a version control system command, (e.g., Git commit) to determine changes between downloaded files in operation 501 that have been filtered in operations 505 and 510 and tagged in operation 515 and a set of source code files currently residing in the version control repository. In some implementations, the set of source code files may be a baseline or a previously saved set of source code files. In an operation 520, process 500 may include saving the changed or changed source code files as a new version or commit within the version control repository. In some embodiments, in an operation 520, process 500 may include saving the changed files within a branch of a version control repository which corresponds to a mainframe environment from which the set of source code files was retrieved in operation 501.

Figure 6:
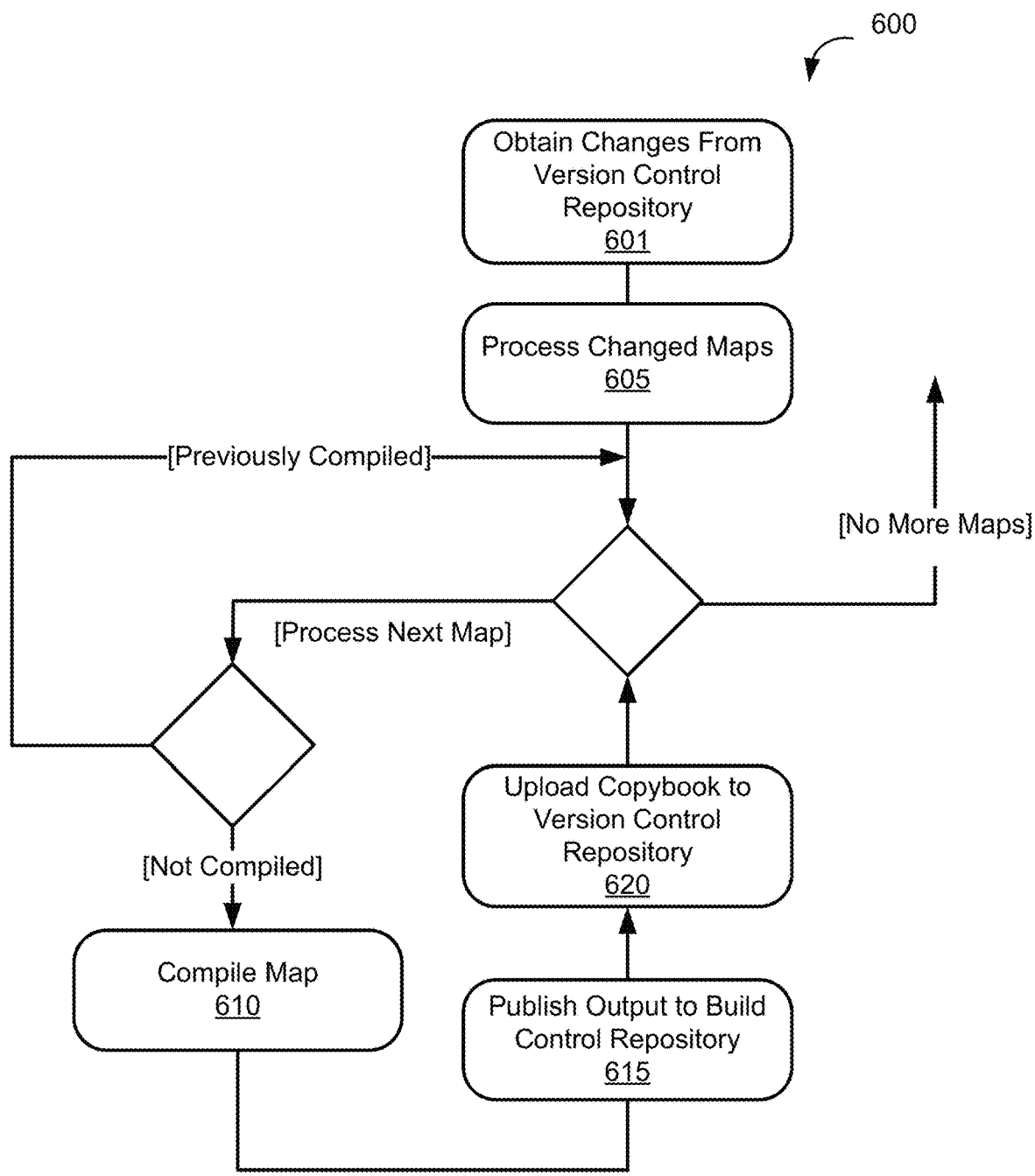
FIG. 6 illustrates a process of processing changed CICS map files in a distributed environment, according to an implementation of the disclosure.

FIG. 6 illustrates a process 600 of processing changed CICS maps files, according to an implementation of the disclosure. In an operation 601, process 600 may include obtaining a changed CICS map file from a version control repository. In an operation 605, process 600 may include processing the changed CICS map file. In some embodiments, in an operation 605, process 600 may include determining whether the changed CICS map file has been previously compiled. In an operation 610, process 600 may include compiling the changed CICS map files that has not been previously compiled. In an operation 615, process 600 may include publishing an output of compiling the changed CICS map file, including build and version information to a build version control repository. In an operation 620, process 600 may include updating corresponding data structures associated with the changed CICS map file.

Figure 7:
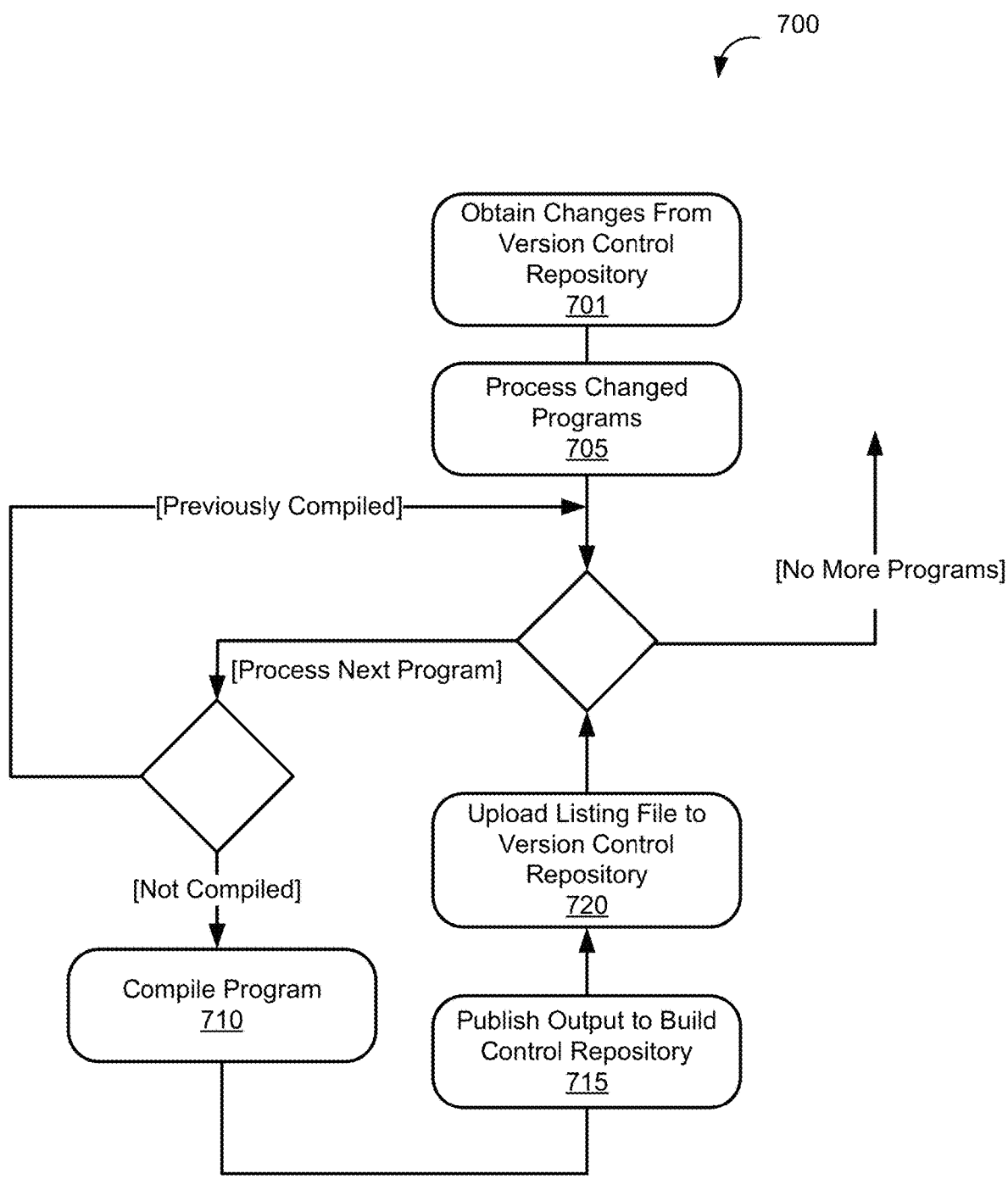
FIG. 7 illustrates a process processing changed source code files in a distributed environment, according to an implementation of the disclosure.

FIG. 7 illustrates a process 700 of processing changed source code files, according to an implementation of the disclosure. In an operation 701, process 700 may include obtaining a changed source code file from a version control repository. In an operation 705, process 700 may include processing the changed source code file. In some embodiments, in an operation 705, process 700 may include determining whether the changed source files has been previously compiled. In an operation 710, process 700 may include compiling the changed source code file that has not been previously compiled. In an operation 715, process 700 may include publishing an output of compiling the changed source code file, including build and version information to a build version control repository. In an operation 720, process 700 may include pushing a listing file to version control repository.

Figure 8:
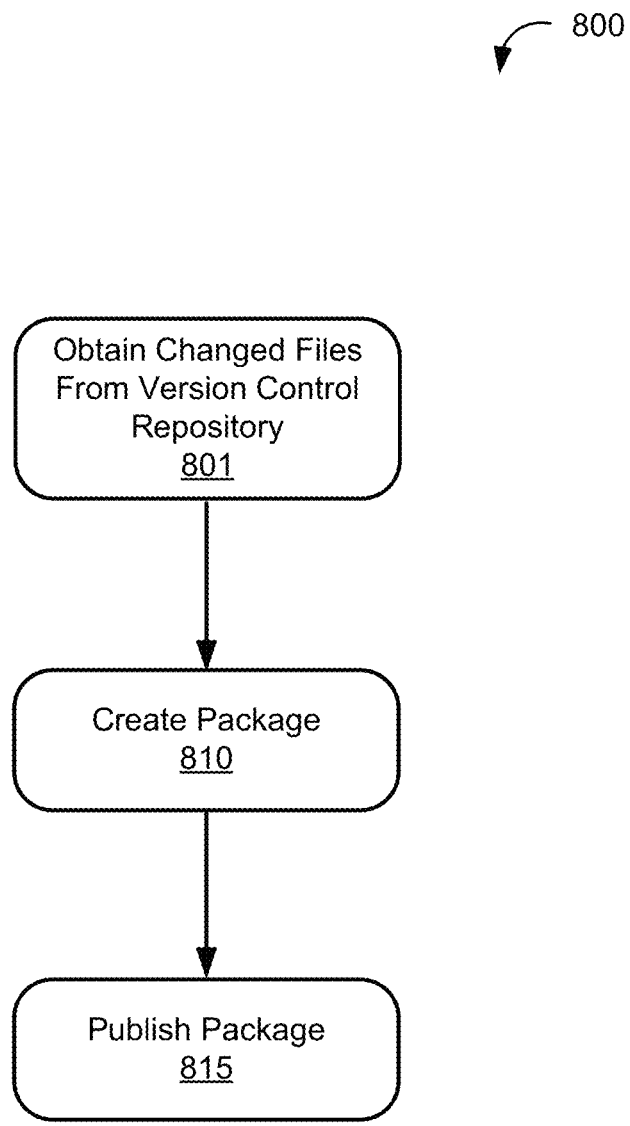
FIG. 8 illustrates a process of publishing changed source code files, according to an implementation of the disclosure.

FIG. 8 illustrates a process 800 of publishing a package, according to an implementation of the disclosure. In an operation 801, process 800 may include obtaining a set of changed source code files from a version control repository. In an operation 810, process 800 may include creating a package. In some embodiments, in an operation 810, process 800 may include creating a package by obtaining one or more output files (i.e., an output of compiling the changed source code file, including build and version information) from a build version control repository. In an operation 815, process 800 may include saving a package generated by the operation 810 to a build version control repository.

Figure 9:
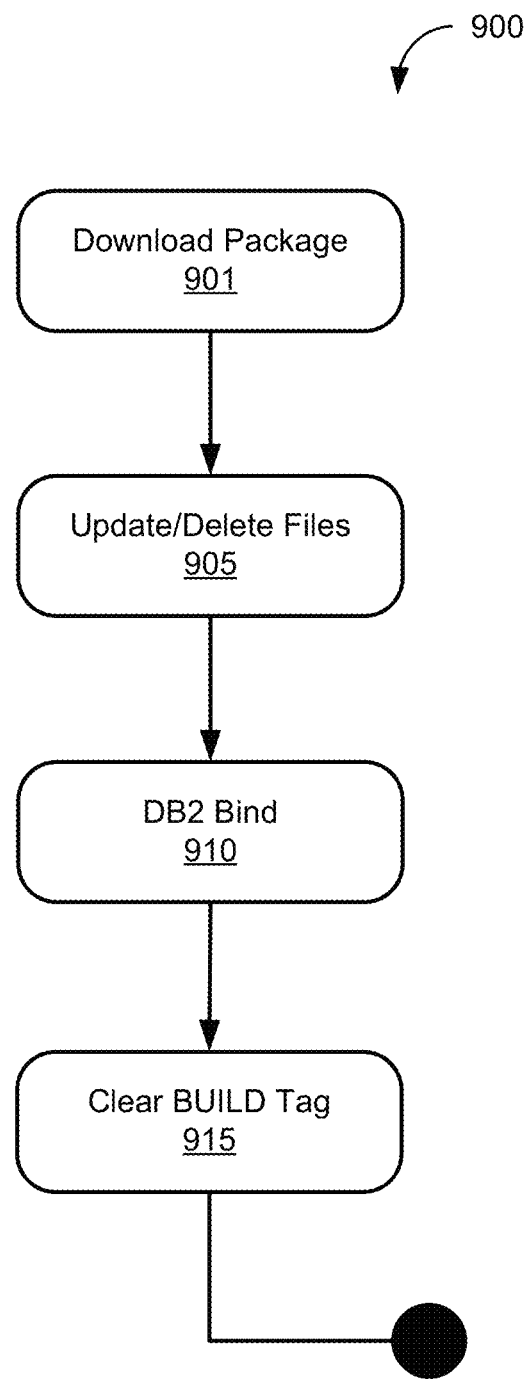
FIG. 9 illustrates a process of deploying changed source code files, according to an implementation of the disclosure.

FIG. 9 illustrates a process 900 of deploying a package, according to an implementation of the disclosure. In an operation 901, process 900 may include downloading a package from a build version control repository. The package may be saved in a build version control repository, as illustrated in operation 815 of FIG. 8. In some embodiments, all steps during process 900 are performed via execution of a single script. The script must accept a name of a package as input using the name of the script as input. For example, the following steps may be utilized during the operation 901 when the package will be downloaded from a build version control repository. In an operation 905, process 900 may include updating and deleting files. In an operation 910, process 900 may include performing the steps associating with a DB2 bind. In an operation 915, process 900 may include removing tags placed during the synchronization process, which signify that these particular source code files are in the process of being deployed and/or installed (e.g., BUILD tag).

The systems and methods of the presently described embodiments may facilitate various advantages. Entities using the synchronization process disclosed herein may maintain and manage a single source code database while implementing the source code files in programs within two divergent system environments, i.e., each system utilizing a distinct build and deployment process. Furthermore, entities may be able to propagate changes made to the source code files by a first system to the source code files used to compile programs within a second system. The first and second systems may be operationally divergent. The foregoing technical improvements reduce operational expenses for the entity. For instance, an ability to maintain and manage a single source code database reduced costs associated with maintaining additional source code databases. Furthermore, synchronizing only changed source code files is a more feasible and cost-effective approach to synchronizing all the source code files each time.

The disclosure describes using a single source code database by divergent environments, (e.g., a mainframe and a distributed environment) for illustration and not limitation. Other types of environments may utilize a single source code database as would be apparent based on the disclosure. Furthermore, the systems and methods disclosed can be utilized in file transfer as well as version control applications.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

The described operations, such as those illustrated in FIGS. 4-9 and described above, may be accomplished using some or all of the system components described in detail herein and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting. It is to be expressly understood that the drawings are for the purpose of illustration and description only and are not intended as a definition of the limits of the invention.

Figure 10:
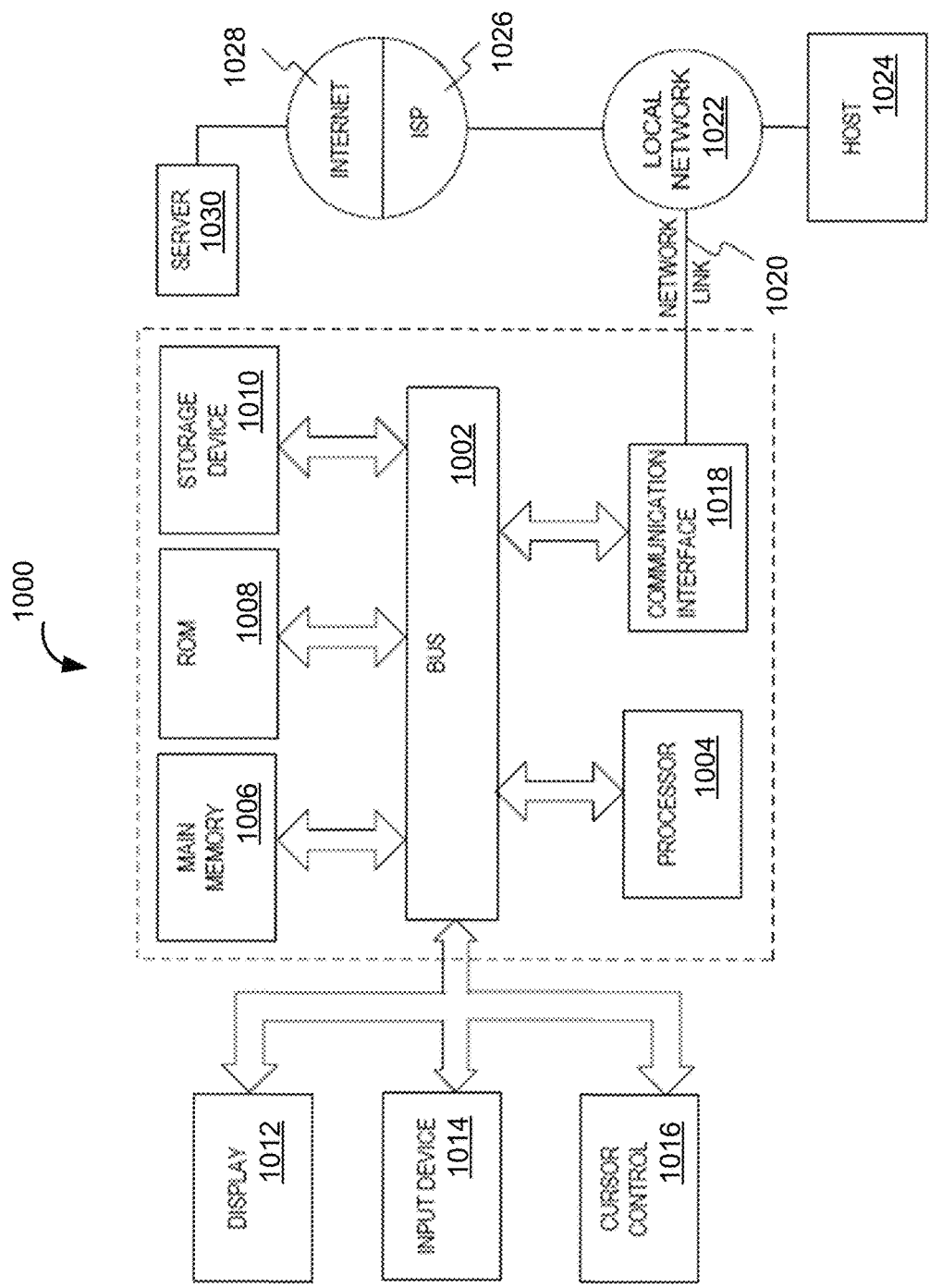
FIG. 10 depicts a block diagram of an example computer system in which any of the embodiments described herein may be implemented.

FIG. 10 depicts a block diagram of an example computer system in which any of the embodiments described herein may be implemented. The various components illustrated in FIGS. 1-4 may be implemented according to the computer system 1000. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1000 may include a user interface component to implement a GUI that may be stored in a mass storage device as executable software codes that are executed by the computing device(s). This and other components may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

The computer system 1000 also includes a communication interface 1018 coupled to bus 1002. Communication interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicate with a WAN). Wireless links may also be implemented. In any such implementation, communication interface 1018 sends and receives electrical, electromagnetic or optical signals that carry digital data streams representing various types of information.

A network link 1020 typically provides data communication through one or more networks to other data devices. For example, a network link may provide a connection through local network to a host computer 1024 or to data equipment operated by an Internet Service Provider (ISP) 1026. The ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network (s), network link and communication interface 1018. In the Internet example, a server 1030 might transmit a requested code for an application program through the Internet 1028, the ISP 1026, the local network 1022 and the communication interface 1018.

The received code may be executed by processor 1004 as it is received, and/or stored in storage device 1010, or other non-volatile storage for later execution.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system, comprising:
   one or more processors; and
   a memory storing instructions that, when executed by the one or more processors, cause the system to perform:
   requesting synchronization of a set of Common Business Oriented Language (COBOL) files from a mainframe in a first geographic location;
   obtaining the set of COBOL files from an environment in the mainframe:
   determining a subset of COBOL files identified for on-soil compilation by applying a plurality of JOB Control Language (JCL) commands to the set of COBOL files, wherein the on-soil compilation is to be performed in a specific second geographic location which is different from the first geographic location;
   storing the subset of COBOL files within a branch of a version control repository in a distributed computing environment located in the second geographic location, wherein the branch of the version control repository in the distributed computing environment corresponds to the environment in the mainframe;
   identifying at least one changed COBOL file within the subset of COBOL files by comparing the subset of COBOL files with an existing set of COBOL files stored within the branch of the version control repository;
   compiling in distributed computing environment the at least one changed COBOL file to generate a binary file;
   storing, by the physical processor, the binary file within a build tracking repository in the distributed computing environment; and
   generating a package file for execution in a computing environment located in the distributed environment, the package file comprising the binary file and at least one associated COBOL file.

2. The system of claim 1, wherein the determining of the set of COBOL files for on-soil compilation comprises obtaining at least one file tag, the at least one file tag identifying COBOL files for the on-soil compilation; and
   wherein the set of COBOL files comprises at least one file for on-soil compilation.

3. The system of claim 2, identifying the at least one file for on-soil compilation within the set of COBOL files comprising the at least one file tag.

4. The system of claim 1, wherein the comparing the subset of COBOL files with the existing set of COBOL files to determine the at least one changed COBOL file comprises using a hash algorithm; and wherein each file within the subset of COBOL files has a counterpart file within the existing set of COBOL files.

5. The system of claim 4, wherein the hash algorithm used to determine the at least one changed COBOL file within the subset of source code files comprises generating a hash value for each file within the subset of COBOL files and the existing set of source code files; and
   wherein a hash value generated for the at least one changed COBOL file is distinct from a hash value generated for a counterpart file of the at least one changed COBOL file within the existing set of COBOL files.

6. The system of claim 1, wherein the determining of the at least one changed COBOL file comprises generating a data tag identifying the at least one changed COBOL file as being ready for compilation; and
   wherein the at least one changed COBOL file comprises the data tag.

7. The system of claim 6, wherein the compiling the at least one changed COBOL file comprises determining whether the at least one changed COBOL file has been previously compiled.

8. The system of claim 1, wherein the generating of the package file comprises linking the binary file stored within the build tracking repository with at least one file of the subset of COBOL files stored within the branch of the version control repository by using a hash algorithm to determine the at least one associated COBOL file.

9. The system of claim 1, further comprising storing the package file to the build tracking repository.

10. The system of claim 9, further comprising removing the data tag identifying the at least one changed COBOL file as being ready for compilation upon saving the package file to the build tracking repository.

* * * * *